US007877186B2

(12) United States Patent
Detlefs et al.

(10) Patent No.: US 7,877,186 B2
(45) Date of Patent: Jan. 25, 2011

(54) METHOD AND SYSTEM FOR IDENTIFYING A MALFUNCTIONING COMPRESSED AIR CONSUMER CIRCUIT IN A VEHICLE ELECTRONIC COMPRESSED AIR SYSTEM

(75) Inventors: Carsten Detlefs, Ronnenberg (DE); Heinrich Diekmeyer, Barsinghausen (DE); Frank-Dietmar Lippelt, Barsinghausen (DE); Joachim Reinhardt, Hannover (DE); Bernd Strilka, Hannover (DE)

(73) Assignee: WABCO GmbH, Hannover (DE)

( * ) Notice: Subject to any disclaimer, the term of this patent is extended or adjusted under 35 U.S.C. 154(b) by 856 days.

(21) Appl. No.: 10/566,055

(22) PCT Filed: Jul. 12, 2004

(86) PCT No.: PCT/EP2004/007652

§ 371 (c)(1),
(2), (4) Date: Mar. 13, 2007

(87) PCT Pub. No.: WO2005/014360

PCT Pub. Date: Feb. 17, 2005

(65) Prior Publication Data
US 2008/0040013 A1    Feb. 14, 2008

(30) Foreign Application Priority Data
Jul. 28, 2003    (DE) ................. 103 34 316
Dec. 10, 2003    (DE) ................. 103 57 766

(51) Int. Cl.
*G06F 7/00*    (2006.01)
*F04B 49/00*    (2006.01)
*F02B 23/00*    (2006.01)

(52) U.S. Cl. .................. 701/78; 417/282; 417/302; 303/9.64; 123/585

(58) Field of Classification Search ............. 701/78; 417/282, 302; 303/9.64; 123/585
See application file for complete search history.

(56) References Cited

U.S. PATENT DOCUMENTS 4,218,882 A    8/1980    Farr (Continued)

FOREIGN PATENT DOCUMENTS

DE    28 21 393 A1    11/1978

(Continued)

OTHER PUBLICATIONS

EU Directive 98/12; Jan. 27, 1998.

*Primary Examiner*—Khoi Tran
*Assistant Examiner*—Ian Jen
(74) *Attorney, Agent, or Firm*—Kramer Levin Naftalis & Frankel LLP

(57) ABSTRACT

To detect a failure of a compressed air consumer circuit in a compressed air system for vehicles, pressure is continuously measured in compressed air consumer circuits and evaluated in an electronic control unit which compares the pressure values and/or determined negative pressure gradients of the compressed air consumer circuits with a respective threshold value and shuts off an air-consumer circuit if the pressure values and/or negative pressure gradients thereof satisfy a circuit-failure criterion. The circuit-failure criterion is satisfied when the pressure values and/or pressure gradients are below the respective threshold value for a time equal to or longer than the time of a dynamic pressure change or of a dynamic pressure collapse.

7 Claims, 2 Drawing Sheets

U.S. PATENT DOCUMENTS

| | | | | |
|---|---|---|---|---|
| 4,484,784 | A | | 11/1984 | Leiber |
| 5,191,956 | A | * | 3/1993 | Ibarrola ...................... 194/317 |
| 5,960,777 | A | * | 10/1999 | Nemser et al. .............. 123/585 |
| 5,992,163 | A | * | 11/1999 | Baruschke et al. ............ 62/156 |
| 6,089,831 | A | * | 7/2000 | Bruehmann et al. ......... 417/282 |
| 6,276,761 | B1 | * | 8/2001 | Beck ........................ 303/9.61 |
| 6,367,887 | B1 | | 4/2002 | Sulzyc |
| 6,712,282 | B2 | * | 3/2004 | Eberspach et al. ...... 237/12.3 C |
| 2002/0119408 | A1 | * | 8/2002 | Eberspach et al. ............ 431/12 |
| 2008/0040013 | A1 | * | 2/2008 | Detlefs et al. ................. 701/78 |

FOREIGN PATENT DOCUMENTS

| | | |
|---|---|---|
| DE | 29 50 904 C2 | 6/1981 |
| DE | 34 35 089 A1 | 4/1986 |
| DE | 41 09 741 C1 | 3/1992 |
| DE | 40 30 361 A1 | 4/1992 |
| DE | 195 15 895 A1 | 10/1996 |
| DE | 196 22 095 A1 | 12/1997 |
| DE | 198 11 305 A1 | 9/1999 |
| DE | 199 28 113 C1 | 10/2000 |
| DE | 694 26 513 T2 | 2/2001 |
| DE | 199 39 529 A1 | 4/2001 |
| DE | 100 04 091 A1 | 8/2001 |
| DE | 100 29 125 A1 | 1/2002 |
| DE | 101 42 790 A1 | 3/2003 |
| EP | 0 477 519 A1 | 4/1992 |
| EP | 0 810 136 A1 | 12/1997 |
| EP | 0 810 136 B1 | 12/1997 |
| EP | 1 004 495 B1 | 5/2000 |
| EP | 1 122 140 A1 | 8/2001 |
| WO | WO 96/34785 | 11/1996 |
| WO | WO 98/47751 | 10/1998 |

* cited by examiner

METHOD AND SYSTEM FOR IDENTIFYING A MALFUNCTIONING COMPRESSED AIR CONSUMER CIRCUIT IN A VEHICLE ELECTRONIC COMPRESSED AIR SYSTEM

BACKGROUND OF THE INVENTION

The present invention relates to an improved method and system for detecting a failure of a compressed air consumer circuit in an electronic compressed air system for vehicles.

Multi-circuit protective valves are known that divide an energy supply into several mutually independent consumer circuits and, in the event of failure of one consumer circuit, for example by line rupture, maintain a minimum pressure in the intact circuits. If a defect allowing more air to be lost than can be resupplied by the compressor occurs in a service-brake circuit, the pressure in the service-brake circuit drops mutually until the pressure reaches the closing pressure of the valve. The pressure in the defective circuit continues to drop, whereas the closing pressure is maintained in the intact circuits. While the pressure in the defective circuit continues to drop, the circuits that are still intact can be refilled by the compressor until the opening pressure of the defective circuit is reached. A dynamic equilibrium is established in which the delivered compressed air can supply the circuits that are still intact (as well as secondary consumer circuits), although at the same time air is being lost via the defect. During compressed air consumption of limited duration, as in the case of heavy braking, momentary dynamic pressure collapses occur which do not correspond to the reservoir pressures of the individual consumer circuits. This behavior is much more pronounced in circuits without compressed air reservoirs than in circuits with compressed air reservoirs. A disadvantage of the known multi-circuit protective valves is that they react to such dynamic pressure collapses and shut off the circuit in question if such circuit has a low pressure level. The occurrence of such momentary dynamic pressure collapses, therefore, leads, at low pressure level, to premature shutoff of circuits, even though the respective pressure at the end of the event (i.e., at the end of the pressure collapse) would still be higher than the closing pressure.

SUMMARY OF THE INVENTION

Generally speaking, in accordance with the present invention, an improved method and system are provided for detecting a failure of a compressed air consumer circuit in an electronic compressed air system for vehicles that preclude premature shutoff of compressed air consumer circuits in response to momentary dynamic pressure collapses.

The present invention includes measuring a variable of state (pressure, air flow rate, air mass, energy) of the individual compressed air consumer circuits and determining whether the measured variable of state or possibly the negative gradient of the variable of state determined for a predefined time satisfies a circuit-failure criterion. The compressed air consumer circuit in question is shut off only when this circuit-failure criterion is satisfied. By virtue of this inventive measure, premature shutoff of compressed air consumer circuits in response to brief dynamic pressure collapses is prevented, for example during intensive braking events. As a result, enhanced vehicle safety is achieved by improved energy supply to compressed air consumer circuits that already have a low pressure level due to air consumption. The present invention ensures that compressed air consumer circuits that already have a low pressure level will be supplied with compressed air for a longer time.

Still other objects and advantages of the present invention will in part be obvious and will in part be apparent from the specification.

The present invention accordingly comprises the various steps and the relation of one or more of such steps with respect to each of the others, and embodies features of construction, combination of elements, and arrangements of parts which are adapted to effect such steps, all as exemplified in the constructions herein set forth, and the scope of the invention will be indicated in the claims.

BRIEF DESCRIPTION OF THE DRAWINGS

The invention will be described in more detail hereinafter on the basis of the accompanying drawings, wherein.

DETAILED DESCRIPTION OF THE PREFERRED EMBODIMENTS

Figure 1:
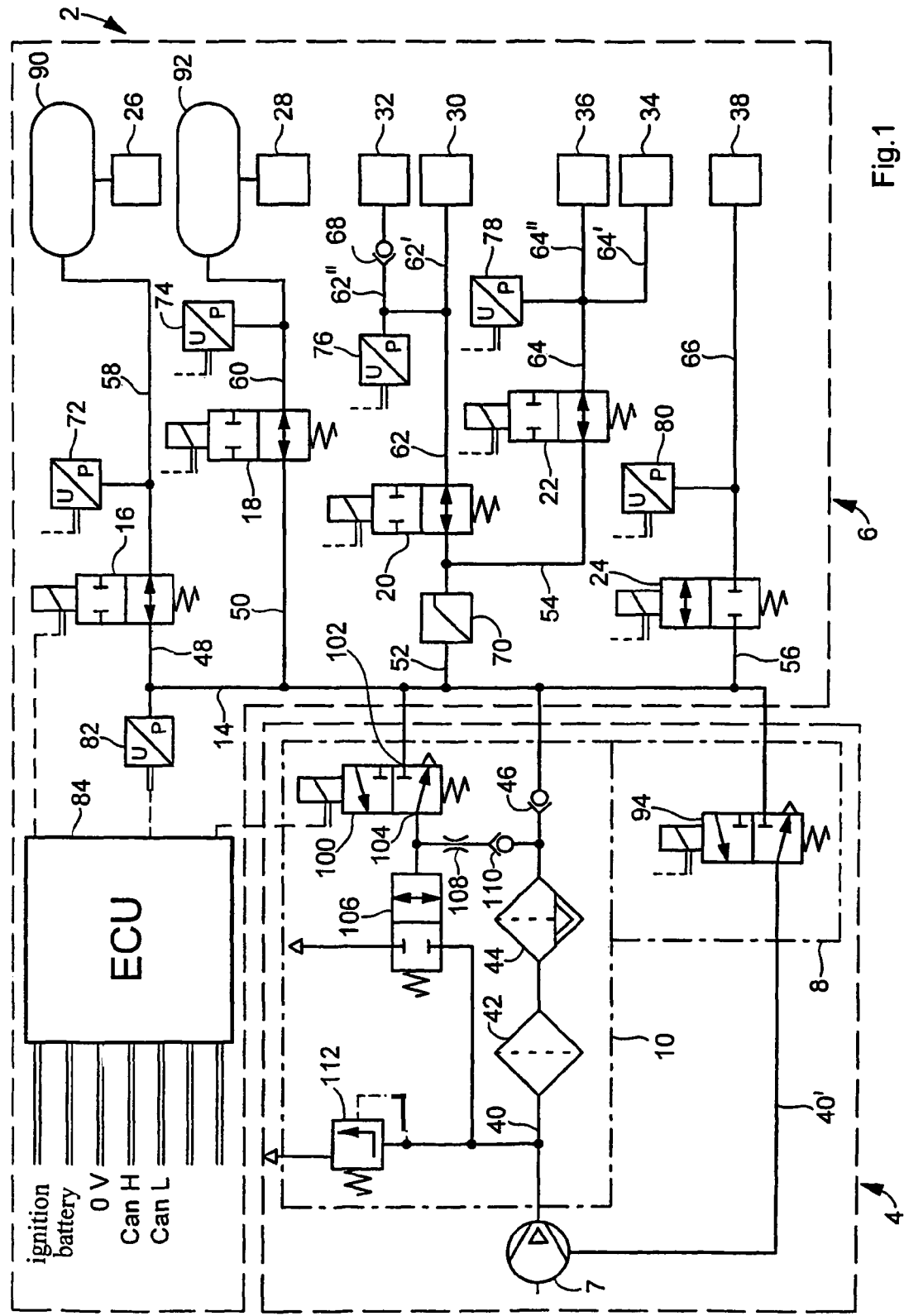
FIG. 1 is a schematic diagram of a compressed air system according to an embodiment of the present invention.

Referring now to FIG. 1, where pressurized-fluid lines are represented by solid lines and electrical lines by broken lines, there is shown a compressed air system 2 with a compressed air supply part 4 and a consumer part 6. Compressed air supply part 4 includes a compressor 7, a compressor control device 8 and an air-dryer part 10.

Consumer part 6 is provided with a compressed air distributor line 14, a plurality of electrically actuatable valves, preferably solenoid valves 16, 18, 20, 22, 24 with restoring springs and a plurality of compressed air consumer circuits 26, 28, 30, 32, 34, 36, 38 supplied with compressed air via the solenoid valves.

From compressor 7, a compressed air supply line 40 leads via a filter 42, an air dryer 44 and a check valve 46 to distributor line 14, from which there are branched off lines 48, 50, 52, 54, 56 leading to the solenoid valves. From the solenoid valves, compressed air lines 58, 60, 62, 64, 66 lead to the consumer circuits. Line 62 splits into lines 62' and 62" leading to circuits 30 and 32, a check valve 68 also being disposed in line 62". A pressure limiter 70 is disposed in supply line 52. Line 54, which leads to solenoid valve 22, branches off downstream from pressure limiter 70. Line 64 splits into lines 64' and 64" leading to circuits 34 and 36.

Pressure sensors 72, 74, 76, 78, 80, 82 monitor the pressure in the compressed air consumer circuits and in distributor line 14, and transmit the respective pressure as a pressure signal to electronic control unit 84, which controls the solenoid valves.

Compressed air consumer circuits 26, 28 can be, for example, service-brake circuits. Compressed air consumer circuit 30 can be a trailer-brake circuit, in which case normally two lines, a supply line and a brake line, lead to the trailer. Compressed air consumer circuit 32 can be a parking-brake circuit with spring accumulator. Compressed air consumer circuits 34 and 36 can be secondary consumer circuits, such as operator's cab suspension, door controller, etc., in other words, all components that have nothing to do with the brake circuits. Compressed air consumer circuit 38 can be a high-pressure circuit.

Service-brake circuits 26, 28 are provided with compressed air reservoirs 90, 92 in conformity with EU Directive 98/12.

The inventive compressed air system makes it possible to dispense with compressed air reservoirs in circuits 30, 32, 34, 36 and also in high-pressure circuit 38. As an example, it is permissible to supply other compressed air consumer circuits from the service-brake circuits (circuits 26 and 28), provided the braking function or braking action of service-brake circuits 26 and 28 is not impaired.

Via a line 40', compressor 7 is mechanically (pneumatically) controlled by compressor controller 8. Compressor controller 8 includes a solenoid valve 94 of small nominal width that can be switched by electronic control unit 84. In the de-energized normal state it is vented, as illustrated, whereby compressor 7 is turned on. If compressor 7 is to be turned off, for example because all compressed air consumer circuits are filled with compressed air, control unit 84 changes over solenoid valve 94 so that the pressure-actuatable compressor is turned off via line 40'. If solenoid valve 94 is switched to de-energized condition, for example because a compressed air consumer circuit needs compressed air, solenoid valve 94 is again switched to the normal state illustrated in the drawing, whereby line 40' is vented and compressor 7 is turned on.

Air-dryer part 10 includes a solenoid valve 100 with small nominal width, whose inlet 102 is in communication with distributor line 14 and via whose outlet 104 there is pneumatically switched a shutoff valve 106, which is in communication with supply line 40 of compressor 7 and is used for venting of the air dryer.

When solenoid valve 100 is switched to passing condition, compressor 7 no longer discharges into the compressed air consumer circuits but instead discharges via valve 106 to the atmosphere. At the same time, dry air flows from distributor line 14 (out of reservoirs 90, 92 of the service-brake circuits) via solenoid valve 100, throttle 108 and a check valve 110 through air dryer 44 for regeneration of its desiccant and further via filter 42 and valve 106 to the atmosphere.

Reference numeral 112 denotes an overpressure valve.

Solenoid valves 16, 18, 20, 22, 24 are controlled by control unit 84, solenoid valves 16 to 22 of compressed air consumer circuits 26 to 34 being open in de-energized normal state, while solenoid valve 24 of the high-pressure circuit is closed in de-energized normal state. Pilot-controlled solenoid valves can also be used. The pressure in the circuits is directly monitored at the solenoid valves by pressure sensors 72, 74, 76, 78, 80.

By virtue of this inventive construction and arrangement, it is possible to do without pressure reservoirs in the consumer circuits (except in the service-brake circuits).

If the pressure were to drop in a compressed air consumer circuit, for example in circuit 30 (trailer-brake circuit), the supply of compressed air also takes place by service-brake circuits 26 and 28, the pressure in compressed air consumer circuits 30 to 36 being adjusted by pressure limiter 70 to a lower level, such as, for example, 8.5 bar, than the pressure level of, for example, 10.5 bar in the service-brake circuit. High-pressure circuit 38 is shut off and therefore is not in communication with the other circuits. The high-pressure circuit usually has a higher pressure than the other compressed air consumer circuits, such as, for example, 12.5 bar.

In compressed air consumer circuits that already have a low pressure level due to air consumption, and in the case that conventional multi-circuit protective valves are used, the danger exists that, if dynamic pressure collapses of limited duration occur for operational reasons, such as during braking events, the compressed air consumer circuits will be immediately shut off, even though no defect due to a line break or the like exists. In order to prevent this, in accordance with the present invention, electronic control unit 84 measures the pressures in the individual compressed air consumer circuits and/or determines negative pressure gradients and compares them with a respective predefinable lower threshold value S (see FIG. 2). The threshold value of pressure corresponds to the pressure to be adjusted in the respective compressed air consumer circuit. If the pressure drops below this threshold value, and/or if the negative pressure gradient decreases below a corresponding threshold value, this indicates a defect in the compressed air consumer circuit in question, due to line rupture, break or the like. In order to be certain whether this conclusion is correct, a test is performed to determine whether a circuit-failure criterion is satisfied. For this purpose the pressure measurements are performed over a predefinable time t (see FIG. 2). The circuit-failure criterion is satisfied when the pressure values and/or pressure gradients are below the respective threshold value for a time t equal to or longer than the time $t_{dyn}$ of a dynamic pressure change or of a dynamic pressure collapse ($t \geq t_{dyn}$). Only if the results are below the threshold value S for a time $t \geq t_{dyn}$, where $t_{dyn}$ is the time from the beginning to the end of a dynamic pressure collapse, is it definitively established that the compressed air consumer circuit in question is defective. The compressed air consumer circuit in question is then shut off. As a result, dynamic events caused by operational reasons are compensated for instead of leading to disadvantageous premature shutoff of the compressed air consumer circuit in question, as would otherwise be the case. The time $t_{dyn}$ is resident in the program of control unit 84 or is measured in real time. An example of a typical time for $t_{dyn}$ is 1 sec.

Figure 2:
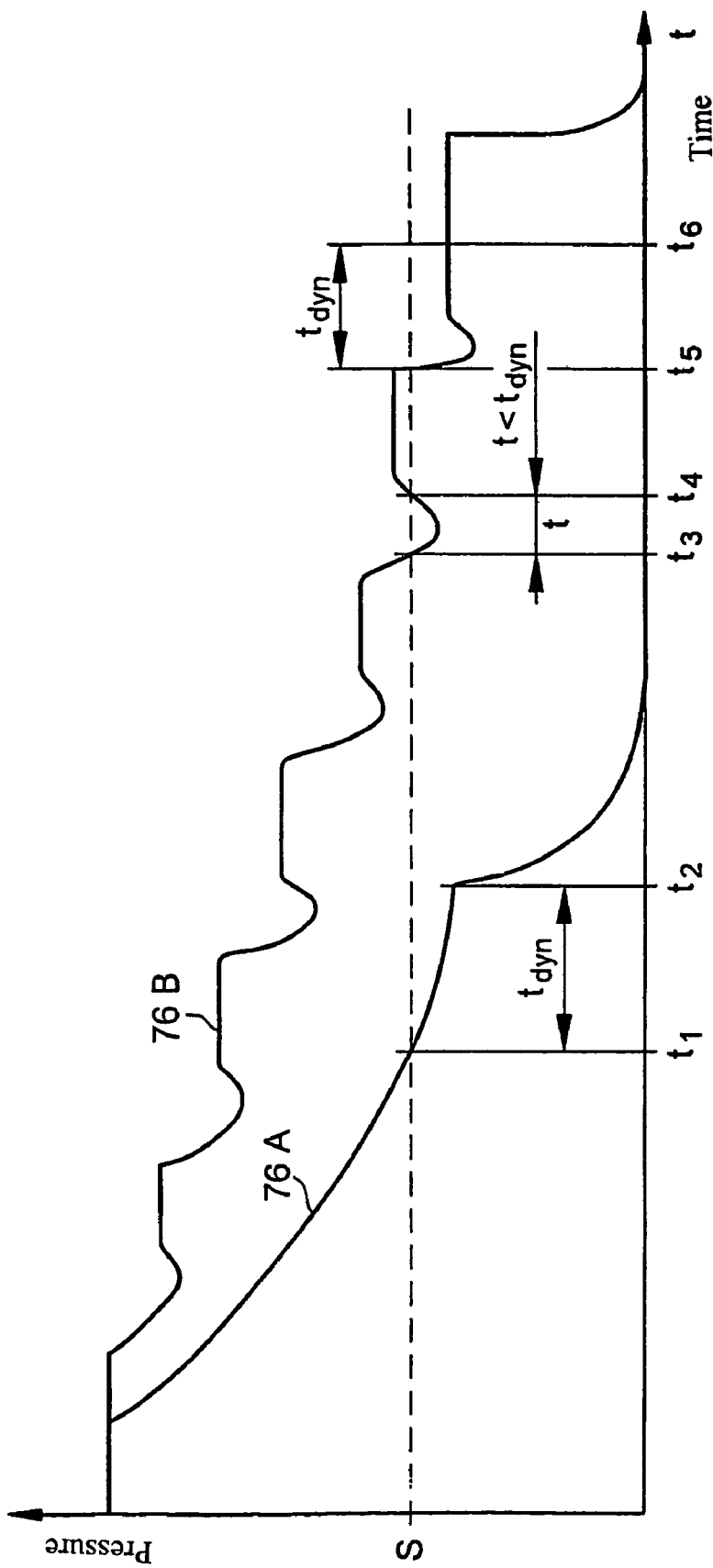
FIG. 2 is a graphical illustration of the pressure variation over time during failure of a compressed air consumer circuit and during a plurality of successive compressed air consumptions of limited duration by the circuit in accordance with an embodiment of the present invention.

Referring now to FIG. 2, curve 76A illustrates the pressure variation, for example in compressed air consumer circuit 30, during failure of that circuit. The pressure drops below the threshold value S at instant $t_1$ and is still below it at instant $t_2$, after a time $t \geq t_2 - t_1 \geq t_{dyn}$ has elapsed. Electronic control unit 84 then detects the fact that compressed air consumer circuit 30 has failed, and it shuts off the circuit by closing solenoid valve 20, since the circuit-failure criterion is satisfied.

Curve 76B in FIG. 2 represents the pressure variation during several successive dynamic compressed air consumptions of limited duration. In the example according to FIG. 2, the pressure does not drop below the threshold value S until instant $t_3$, during the fifth dynamic compressed air consumption. At instant $t_4$, the pressure rises above the threshold value once again, and thus the dynamic compressed air consumption is ended. Since the time $t = t_4 - t_3$ is $< t_{dyn}$, the circuit in question is not shut off, since the circuit-failure criterion is not met. Only during the following dynamic compressed air consumption, starting at instant $t_5$, does the pressure drop below the threshold value S for a time $t \geq t_6 - t_5 \geq t_{dyn}$. In this case, the circuit-failure criterion is satisfied and the circuit in question is shut off.

As an alternative to pressure, it is also possible to monitor other variables of state, such as air flow rate, air mass and energy, of the compressed air consumer circuits.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for detecting failure of an air consumer circuit in a compressed air system, comprising the steps of measuring a variable of state in a compressed air consumer circuit, comparing at least one of said variable of state and a negative gradient of said variable of state against a respective threshold value, and when at least one of said variable of state and said negative gradient of said variable of state satisfies a preselected circuit-failure criterion, shutting off said compressed air consumer circuit, and wherein said preselected circuit-failure criterion is satisfied when at least one of said variable of state and said negative gradient of said variable of state is below said respective threshold value for a time at least one of equal to and greater than a time of at least one of a dynamic change of said variable of state and a dynamic collapse of said variable of state.

2. The method according to claim 1, wherein said threshold value for said variable of state corresponds to a value of said variable of state to be adjusted in said compressed air consumer circuit.

3. A detection system for detecting failure of compressed air consumer circuits in a compressed air system comprising:
   a compressed air supply part having a compressor;
   a consumer part having a plurality of compressed air consumer circuit; and
   electrically actuatable valves for supplying compressed air to said compressed air consumer circuits; and
   the detection system comprising:
      sensors for monitoring pressure in said compressed air consumer circuits; and
      an electronic control unit for evaluating electrical signals from said sensors and for controlling said electrically actuatable valves, said electrically actuatable valves associated with said compressed air consumer circuits being open, said control unit operative to:
         compare at least one of a variable of state in individual ones of said compressed air consumer circuits and a negative gradient of said variable of state against a respective threshold value;
         identify failed ones of said compressed air consumer circuits;
         determine that at least one of said variable of state and negative gradient thereof satisfy a preselected circuit-failure criterion when at least one of said variable of state and said negative gradient is below said respective threshold value for a time at least one of equal to and greater than a time of at least one of a dynamic change of said variable of state and a dynamic collapse of said variable of state; and
         switch ones of said electrically actuated valves associated with said failed ones of said compressed air consumer circuits to a closed state to shut off said failed ones of said compressed air consumer circuits.

4. The system according to claim 3, wherein said threshold value for said variable of state corresponds to a value of said variable of state to be adjusted in said failed ones of said compressed air consumer circuits.

5. The system according to claim 3, wherein said electrically actuatable valves are solenoid valves.

6. The method according to claim 1, wherein said variable of state is at least one of pressure, air flow rate, air mass and energy of said compressed air consumer circuit.

7. The system according to claim 3, wherein said variable of state is at least one of pressure, air flow rate, air mass and energy of said compressed air consumer circuits.

* * * * *